(12) United States Patent
Shindoh et al.

(10) Patent No.: US 10,070,003 B2
(45) Date of Patent: Sep. 4, 2018

(54) IMAGE PROCESSING APPARATUS, IMAGE PROCESSING METHOD AND COMPUTER PROGRAM PRODUCT

(71) Applicants: Hidenori Shindoh, Tokyo (JP); Shuko Kubo, Kanagawa (JP)

(72) Inventors: Hidenori Shindoh, Tokyo (JP); Shuko Kubo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/459,471

(22) Filed: Mar. 15, 2017

(65) Prior Publication Data

US 2017/0272603 A1      Sep. 21, 2017

(30) Foreign Application Priority Data

Mar. 17, 2016   (JP) .................................. 2016-054566

(51) Int. Cl.
    H04N 1/40       (2006.01)
    H04N 1/32       (2006.01)
    (Continued)

(52) U.S. Cl.
    CPC ..... *H04N 1/32144* (2013.01); *H04N 1/00832* (2013.01); *H04N 1/32352* (2013.01);
    (Continued)

(58) Field of Classification Search
    CPC ................................................. H04N 1/32144
    See application file for complete search history.

(56) References Cited

U.S. PATENT DOCUMENTS

2004/0145661 A1   7/2004  Murakami et al.
2006/0080538 A1*  4/2006  Kusuda ................. G06T 1/0071
                                                      713/176
(Continued)

FOREIGN PATENT DOCUMENTS

JP      2003-256762      9/2003
JP      2004-282677      10/2004
(Continued)

OTHER PUBLICATIONS

Extended European Search Report dated Aug. 4, 2017 in European Patent Application No. 17161133.8.

*Primary Examiner* — King Poon
*Assistant Examiner* — Michael Burleson
(74) *Attorney, Agent, or Firm* — Oblon, McClelland, Maier & Neustadt, L.L.P.

(57) ABSTRACT

An image processing apparatus includes: an operation receiver, an image processor configured to perform image processing to add a digital watermark containing address information of the image processing apparatus to a first image to thereby generate a second image; a communication controller configured to receive a taking-out request to take out the digital watermark contained in the second image from an information processing device; and a storage controller configured to store a log in a storage unit. When receiving the taking-out request, the image processor performs image processing to take out the digital watermark contained in the second image to thereby generate the first image. The communication controller transmits the first image generated by the image processor to the information processing device. The storage controller stores, in the storage unit, the log containing identification information identifying the user of the information processing device from which the taking-out request is transmitted.

7 Claims, 11 Drawing Sheets

(51) Int. Cl.
*H04N 1/44* (2006.01)
*H04N 1/00* (2006.01)

(52) U.S. Cl.
CPC ... *H04N 1/4413* (2013.01); *H04N 2201/0039* (2013.01); *H04N 2201/0094* (2013.01); *H04N 2201/3207* (2013.01)

(56) References Cited

U.S. PATENT DOCUMENTS

| | | |
|---|---|---|
| 2008/0129758 A1* | 6/2008 | Fox .................... H04N 1/32128 345/661 |
| 2009/0214137 A1 | 8/2009 | Takahashi |
| 2009/0296136 A1 | 12/2009 | Tanaka |
| 2013/0050717 A1 | 2/2013 | Takahashi |
| 2014/0233064 A1 | 8/2014 | Tanaka |

FOREIGN PATENT DOCUMENTS

| | | |
|---|---|---|
| JP | 2006-74570 A | 3/2006 |
| JP | 2009-171174 | 7/2009 |
| JP | 4406589 | 11/2009 |

* cited by examiner

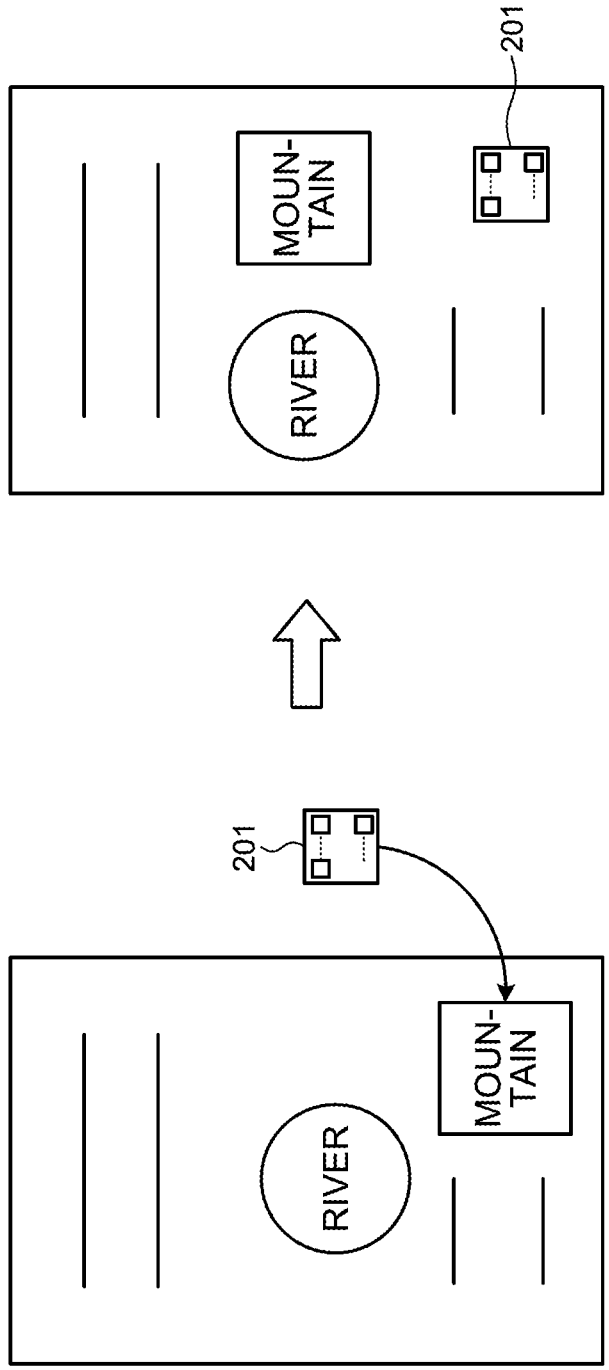

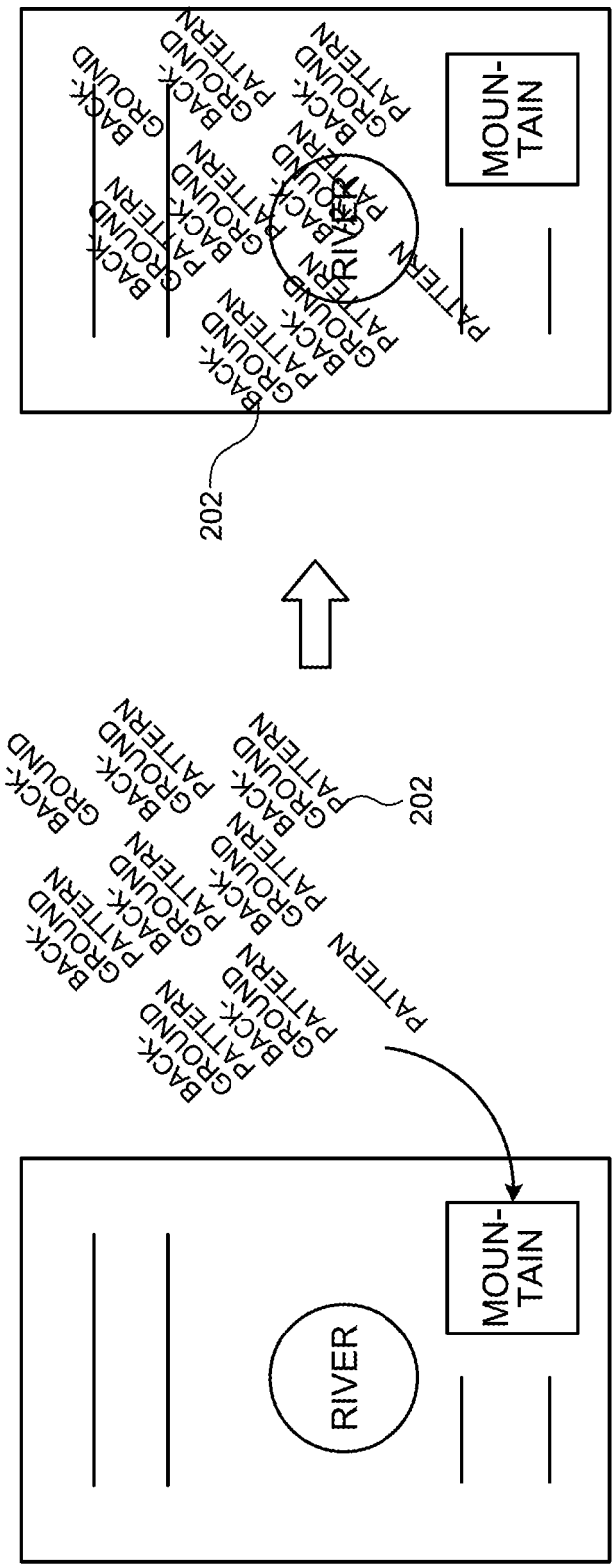

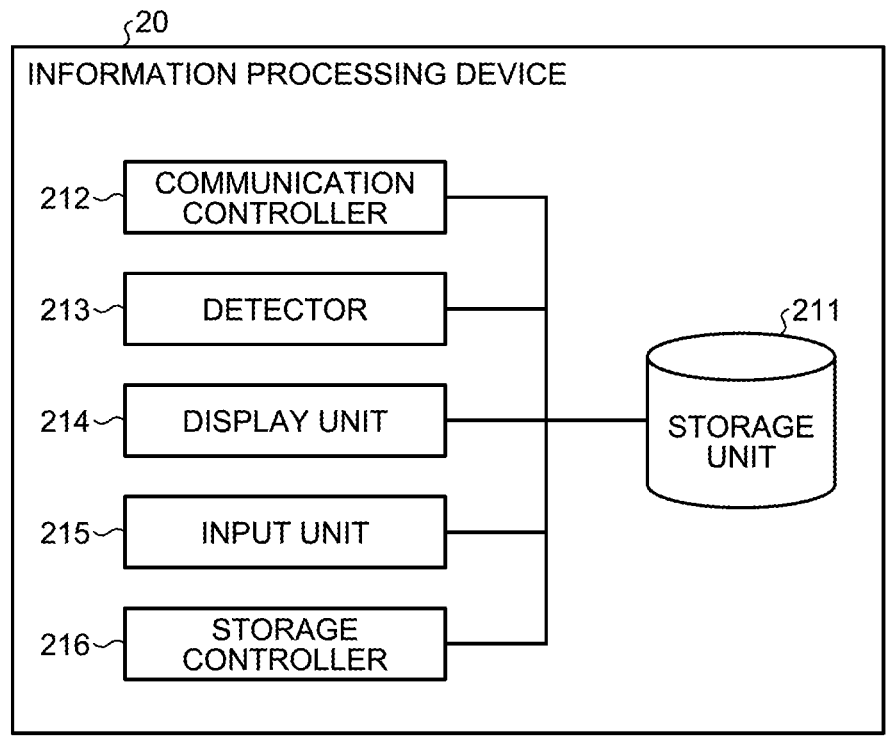

IMAGE PROCESSING APPARATUS, IMAGE PROCESSING METHOD AND COMPUTER PROGRAM PRODUCT

CROSS-REFERENCE TO RELATED APPLICATIONS

The present application claims priority under 35 U.S.C. § 119 to Japanese Patent Application No. 2016-054566, filed on Mar. 17, 2016. The contents of which are incorporated herein by reference in their entirety.

BACKGROUND OF THE INVENTION

1. Field of the Invention

The present invention relates to an image processing apparatus, an image processing method and a computer program product.

2. Description of the Related Art

In recent years, there has been an increasing interest in risks of information leakage. According to the investigation report on information security incidents in 2013 by Japan Network Security Association (JNSA), the rates of routes of information leakage include 67.7% of paper media and 16.4% of electronic mails and portable recording media (such as USB memories). Information leakage via paper media, e-mails and portable recording media occupies 84% of the whole, which is a significantly high percentage.

A technology applying digital watermarking to information security measures has been known as a technology of preventing information leakage. For example, Japanese Patent No. 4406589 discloses an invention of a network printing system configured to determine whether there is sniffing of print data by a sniffer between a user device and a printing apparatus.

The conventional technology however has difficulty in specifying users of a printed matter that is, for example, a paper medium with a print thereon and information contained in electronic data. When information leaks, it is difficult to specify the route of the information leakage.

SUMMARY OF THE INVENTION

According to one aspect of the present invention, an image processing apparatus is connected to a plurality of information processing devices via a network. The image processing apparatus includes an operation receiver, an authentication controller, an image processor, a communication controller, and a storage controller. The operation receiver receives an operation input from a user. The authentication controller authenticates a user of the information processing device that connects to the image processing apparatus and a user who operates the operation receiver. The image processor performs image processing to add a digital watermark containing address information of the image processing apparatus to a first image to be processed by the image processing apparatus to thereby generate a second image. The communication controller receives a taking-out request to take out the digital watermark contained in the second image from the information processing device. The storage controller stores, in a storage unit, a log representing operations of the image processing apparatus that are performed according to an instruction of the user who is authenticated by the authentication controller. When the communication controller receives the taking-out request, the image processor performs image processing to take out the digital watermark contained in the second image to thereby generate the first image. The communication controller transmits the first image that is generated by the image processor to the information processing device. The storage controller stores, in the storage unit, the log containing identification information that identifies the user of the information processing device from which the taking-out request is transmitted.

BRIEF DESCRIPTION OF THE DRAWINGS

FIG. 5 is a diagram illustrating Example 1 where adding a visible code has an effect on the appearance;

FIG. 6 is a diagram illustrating Example 2 where adding a background pattern has an effect on the appearance;

FIG. 7 is a diagram of an exemplary functional configuration of an information processing device according to the embodiment;

FIG. 8 is a diagram of an exemplary authentication screen according to the embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
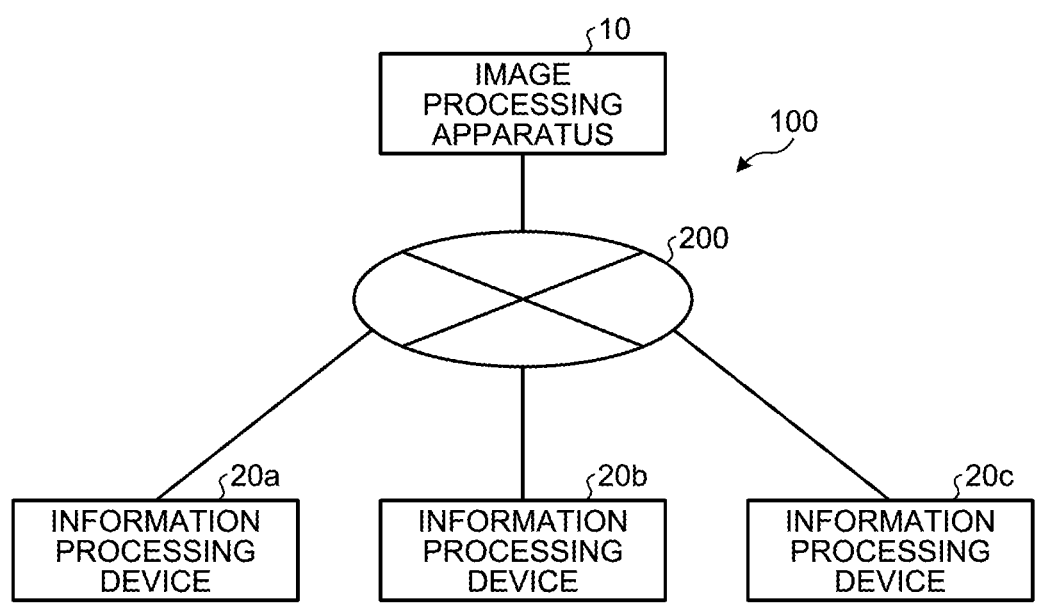
FIG. 1 is a diagram of an exemplary device configuration of an information processing system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide an image processing apparatus, an image processing method and a program that make it possible to specify users of a printed matter that is printed by an image processing apparatus and information contained in electronic data that is generated by the image processing apparatus.

Device configurations of Image Processing System

First of all, an exemplary device configuration of an information processing system according to the embodiment will be described.

FIG. 1 is a diagram of an exemplary device configuration of an image processing system 100 according to the embodiment. The image processing system 100 according to the embodiment includes an image processing apparatus 10, an information processing device 20a, an information processing device 20b and an information processing device 20c. The information processing device 20a, the information processing device 20b and the information processing device 20c will be referred simply as information processing devices 20 when they are not particularly distinguished from one another.

The image processing apparatus 10 and the information processing devices 20 are connected via a network 200. The communication system of the network 200 may be any one of a wired system and a wireless system. Alternatively, the network 200 may be put into use by a combination of a wired system and a wireless system.

The image processing apparatus 10 is, for example, a multifunction peripheral (MFP). The information processing devices 20 are, for example, a personal computer and a smart device.

Software Configuration of Image Processing Apparatus

An exemplary software configuration of the image processing apparatus 10 according to the embodiment will be described.

Figure 2:
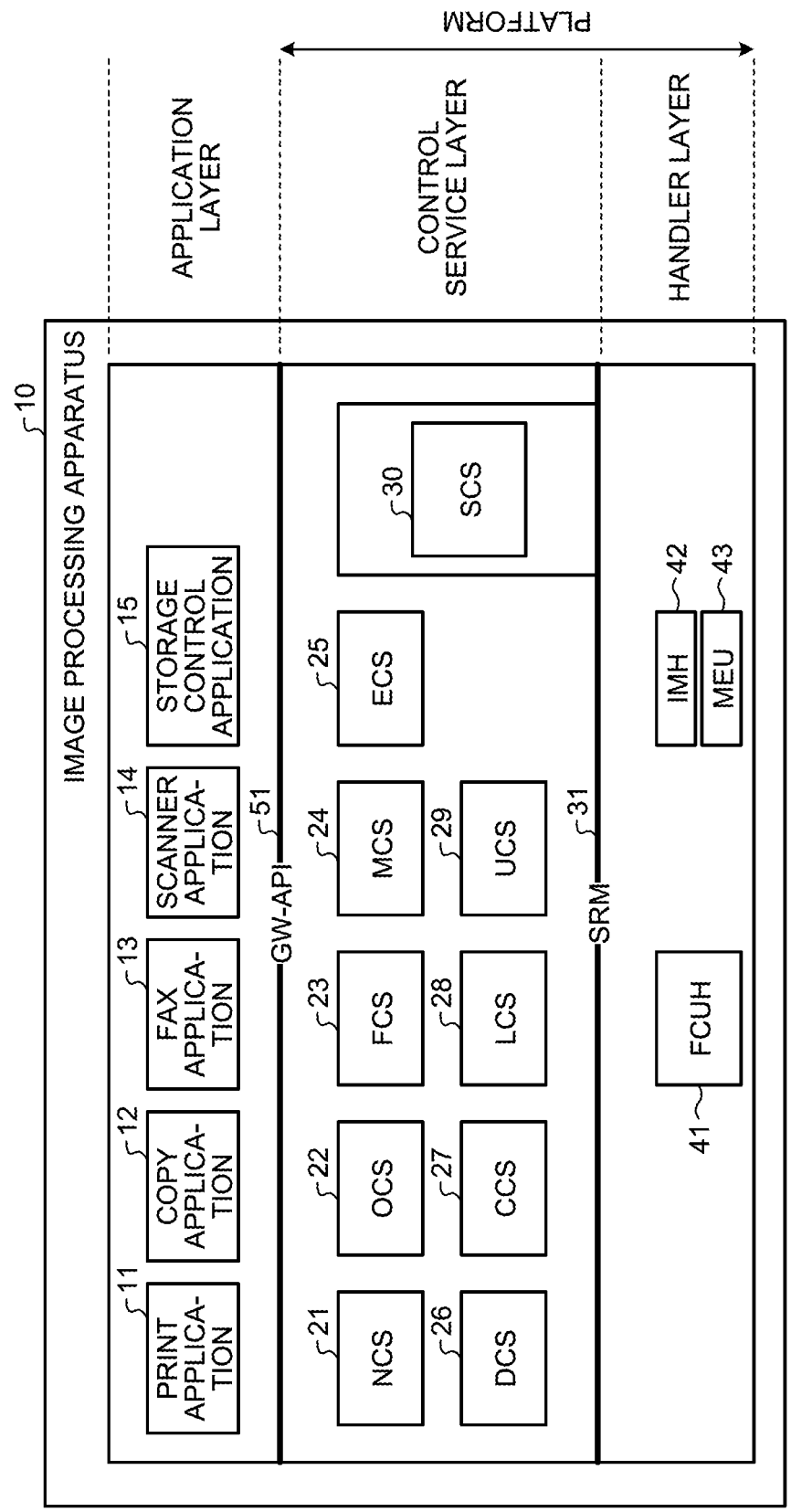
FIG. 2 is a diagram of an exemplary software configuration of an image processing apparatus according to the embodiment.

FIG. 2 is a diagram of an exemplary software configuration of the image processing apparatus 10 according to the embodiment. The image processing apparatus 10 according to the embodiment includes software of an application layer and software of a platform. The software of the platform includes software of a control service layer and software of a handler layer. Part of the image processing apparatus 10 or all the software according to the embodiment may be put into use by using hardware.

The software of the platform receives a process request from the software of the application layer according to a GW-API 51. The GW-API 51 is a pre-defined function for executing a process for using the software of the control service layer from the software of the application layer.

The software of the application layer and the software of the platform run on an operating system (OS), such as UNIX (trademark). The OS executes the software of the application layer and the software of the platform as processes in parallel.

The software of the application layer performs processes to implement services provided by the image processing apparatus 10 to users.

The application layer has a print application 11, a copy application 12, a fax application 13, a scanner application 14 and a storage control application 15. The print application 11 performs a process of controlling a print function. The copy application 12 performs a process of controlling a copy function. The fax application 13 performs a process of controlling a fax function. The scanner application 14 performs a process of controlling a scanner function.

The storage control application 15 performs storage control processes, such as reading, adding, changing and deleting information. The information stored in the image processing apparatus 10 is stored in a memory 62 and a hard disk drive (HDD) 63 (see FIG. 3), which will be described below. The storage control application 15 makes a setting with respect to authority to access the information stored in the image processing apparatus 10. For example, a sharing setting allowing access of multiple users is made with respect to the access authority. Part or all the processes performed by the storage control application 15 may be executed by the OS.

The software of the control service layer receives a process request from the software of the application layer and transmits a hardware resource acquisition request based on the process request to a system resource manager 31 (SRM) 31. Descriptions of the SRM 31 will be given below.

The control service layer has a network control service (NCS) 21, an operation panel control service (OCS) 22, a fax control service (FCS) 23, a memory control service (MCS) 24, an engine control service (ECS) 25, a delivery control service (DCS) 26, a certification and charge control service (CCS) 27, a log control service (LCS) 28, a user control service (UCS) 29, and a system control service (SCS) 30.

The NCS 21 performs a communication control process on software that requires a network I/O. Specifically, the NCS 21 allocates sets of data received according to various protocols from the information processing devices 20 via the network 200 to sets of software that run on the image processing apparatus 10. The NCS 21 transmits sets of data received from sets of software running on the image processing apparatus 10 according to various protocols to the information processing devices 20 that are connected to the network 200.

The OCS 22 performs a process of controlling an operation panel that receives operation inputs made by a user.

In response to a request from the fax application 13, the FCS 23 performs a fax transmission and reception process by using the PSTN (Public Switched Telephone Network) or the ISDN (Integrated Services Digital Network). The FCS 23 also performs a process of registering fax data in a backup memory, a process of quoting fax data from the backup memory, a process of reading fax data, and a process of printing performed on receiving a fax.

The MCS 24 performs a storage control process on, for example, acquiring and freeing a memory to be used by each set of software and writing and reading HDD data.

The ECS 25 performs a process of controlling an engine 74 (see FIG. 3) that is hardware that performs scanning and printing.

The DCS 26 performs a control process on, for example, distribution of the information that is stored in the image processing apparatus 10.

The CCS 27 performs a control process on a user authentication process and on a process of making a charge for a service that is implemented by the image processing apparatus 10.

Any authentication process may be performed to authenticate a user. The user authentication process includes, for example, a process of reading an ID card that identifies a user and a process of performing collation on a combination of the identification information of the user and a password.

The process of reading an ID card is a process performed by a reading device using, for example, NFC (Near Field Communication) to read identification information of a user that is contained in an ID card from the ID card.

The process of performing collation on a combination of the user identification information and a password is a process of receiving inputs of the user identification information and a password and collating the user identification information and the password with a combination of the user identification information and a password that are stored in the image processing apparatus 10. When the image processing apparatus 10 is used from the information processing device 20 via the network 200, for example, the image processing apparatus 10 receives the user identification information and a password from the information processing device 20 and authenticates the user of the information processing device 20 accordingly.

The LCS 28 performs a storage control process on a log that is output from each set of software running on the image processing apparatus 10.

The UCS 29 performs a storage control process on, for example, reading, adding, changing and deleting user information. The user information is, for example, the identification information of a user and a password that are used to authenticate the user.

The SCS 30 performs a control process on, for example, software management, control on an operation unit, such as an operation panel, display of a system screen, display of an LED, management of hardware resources and interrupt application control.

The SRM 31 performs a control process on the system of the image processing apparatus 10 in cooperation with the SCS 30 and a process of controlling hardware resources. The SRM 31 receives hardware resource acquisition requests from the software of the upper layer that uses hardware, such as the plotter contained in the engine 74 (see FIG. 3), adjusts the hardware resource acquisition requests received from the software, and performs control on allocation of at least one hardware resource.

Specifically, the SRM 31 determines whether a hardware resource that is specified by a hardware resource acquisition request is usable (whether the hardware resource is not used by another set of software in response to a hardware resource acquisition request received from another set of software). When the hardware resource specified by the hardware resource acquisition request is usable, the SRM 31 notifies the software of the upper layer from which the hardware resource acquisition request is transmitted of the face that the hardware resource is usable.

The SRM 31 reschedules hardware resource acquisition requests received from the upper layer and accordingly issues instructions to execute operations specified by the respective hardware resource acquisition requests (such as paper conveyance, an image formation operation, keeping a free memory, and file generation). When the SRM 31 issues an execution instruction directly to the engine 74 (see FIG. 3), an engine I/F is used. The engine I/F is a pre-defined function for issuing a process request to the engine 74.

The software of the handler layer receives a hardware resource acquisition request from the SRM 31 and acquires a hardware resource according to the hardware resource acquisition request.

The handler layer has a fax control unit handler (FCUH) 41, an image memory handler (IMH) 42 and a media edit utility (MEU) 43.

The FCUH 41 receives a hardware resource acquisition request for a fax control unit that is contained in the engine 74 (see FIG. 3) from the SRM 31 and performs operation control on the fax control unit. The above-described engine I/F is used also when the FCUH 41 transmits a process request to the fax control unit.

The IMH 42 receives the hardware resource acquisition request for a memory from the SRM 31 and performs control on allocation of the memory to be used by the software of the upper layer.

The MEU 43 receives the hardware resource acquisition request from the SRM 31 and performs operation control on the hardware that performs image processing, such as control on addition of a digital watermark and control on image conversion.

A case where the image processing apparatus 10 performs a copy process will be described specifically as an exemplary operation of the software.

First of all, the user authentication process is performed by the OCS 22, the CCS 27 and the UCS 29. Specifically, on receiving an operation input representing user identification information and a password, the OCS 22 transmits the user identification information and the password to the CCS 27. On receiving the user identification information and the password, the CCS 27 checks whether a combination of the user identification information and the password is stored in the image processing apparatus 10 via the UCS 29 and accordingly authenticates the user.

The OCS 22 then receives an operation input, such as pressing a copy button, representing that the copy application 12 is to be caused to run.

The copy application 12 then requests the MCS 24 to acquire a memory to be used for the copy process and requests the ECS 25 to control reading by the engine 74 (see FIG. 3) and accordingly the software (the SCS 30 and the SRM 31) of the lower service layer executes the process. The SRM 31 transmits and receives information to and from the engine 74 via the engine I/F. On the other hand, the data that is output from the engine 74 is stored in a memory on which the IMH 42 performs storage control.

The IMH 42 records an image in the HDD 63 (see FIG. 3) according to operation inputs made by the user and the setting in the image processing apparatus 10 and requests the MEU 43 to execute a process of adding a digital watermark to the image.

When the ECS 25 inputs the image to which the digital watermark is added (the second image to be described below) to the engine 74, the engine 74 prints the image with the added digital watermark.

The LCS 28 stores, in the image processing apparatus 10, the logs of a series of processes from the user authentication process to the printing process performed by the sets of software.

Hardware Configuration of Image Processing Apparatus

An exemplary hardware configuration of the image processing apparatus 10 according to the embodiment will be described.

Figure 3:
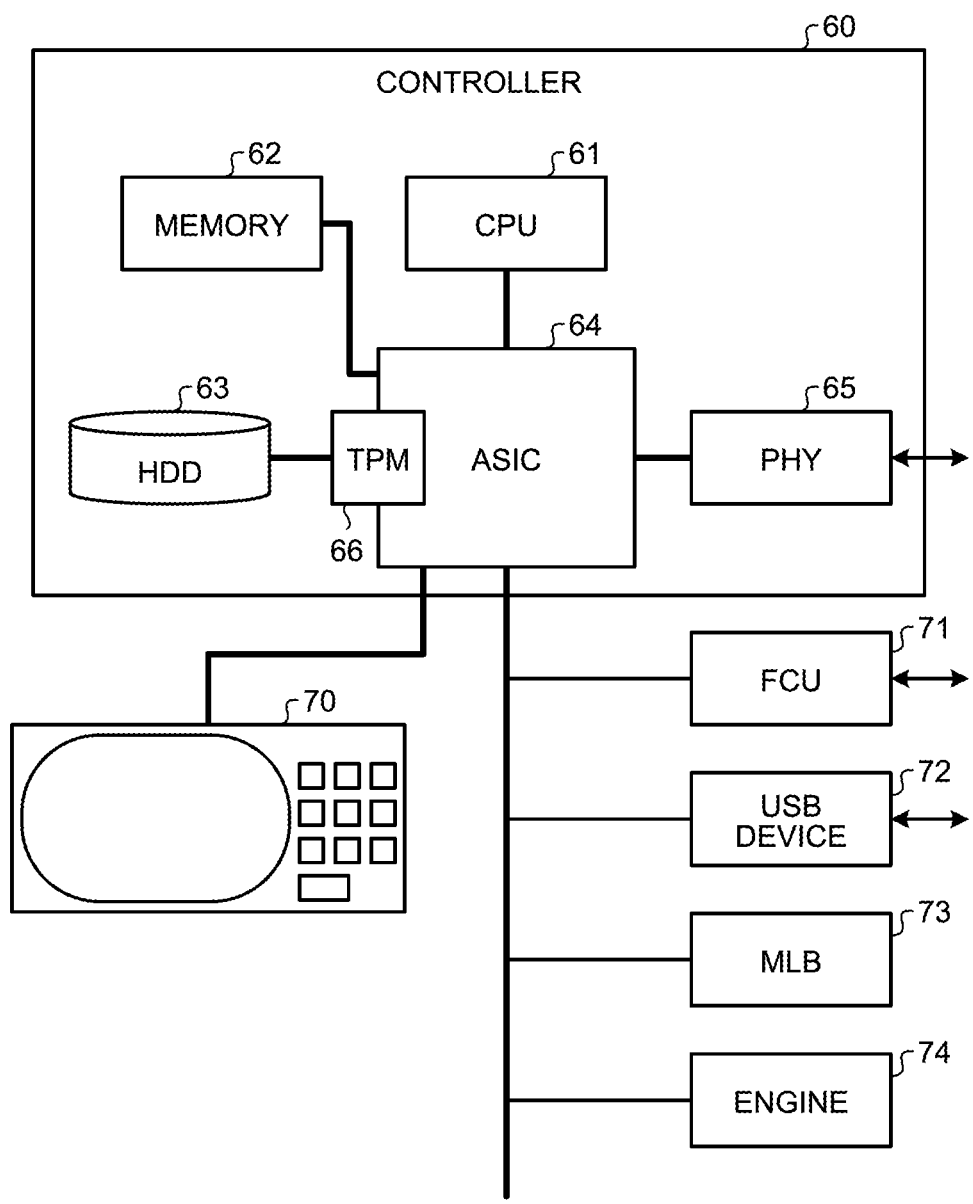
FIG. 3 is a diagram of an exemplary hardware configuration of the image processing apparatus according to the embodiment.

FIG. 3 is a diagram of an exemplary hardware configuration of the image processing apparatus 10 according to the embodiment. The image processing apparatus 10 according to the embodiment includes a controller 60, an operation panel 70, a facsimile control unit (FCU) 71, a universal serial bus (USB) device 72, a media link board (MLB) 73 and the engine 74.

The controller 60 is a control device that controls operations of the image processing apparatus 10. The controller 60 includes a central processing unit (CPU) 61, the memory 62, the HDD 63, an application specific integrated circuit (ASIC) 64, a physical layer chip (PHY) 65, and a trusted platform module (TPM) 66.

The CPU 61 runs the software of the application layer, the control service layer and the handler layer that control operations of the image processing apparatus 10.

The memory 62 is a main storage device of the image processing apparatus 10. The HDD 63 is an auxiliary storage device. The HDD 63 stores, for example, the software of the application layer, the control service layer and the handler layer. The software of the application layer, the control service layer and the handler layer is read by the CPU 61 from the HDD 63 and accordingly is loaded into the memory 62.

The ASIC 64 is an integrated circuit that controls operations of the image processing apparatus 10. The CPU 61, the memory 62, the HDD 63, the PHY 65, the TPM 66, the operation panel 70, the FCU 71, the USB device 72, the MLB 73 and the engine 74 are connected to the ASIC 64 via a data transfer bus.

The PHY 65 controls communications with the information processing devices 20 connected to the network 200.

The TPM 66 is a security chip that stores information with high confidentiality, such as an encryption key. The encryption key is, for example, a secret key (decryption key). Storing the encryption key not in the HDD 63 but in the TPM 66 makes it possible to lower risks of leakage of the encryption key.

For example, when decrypting the data that is encrypted by a public key of public key encryption, the TPM 66 decrypts the data by using the secret key that is stored in the TPM 66.

Furthermore, for example, when an image read request is made in the copy application 12, the fax application 13 and the scanner application 14, the TPM 66 stores, in the HDD 63, the image that is encrypted with the encryption key that is stored in the TPM 66.

The operation panel 70 is a user interface that receives instructions to execute various jobs, setting inputs, etc., and displays various types of information represented to a user.

The FCU 71 is a control unit that controls a facsimile function of the image processing apparatus 10.

The USB device 72 is an interface to which a USB device is connected.

The MLB 73 is a conversion board that converts the format of the image data.

The engine 74 includes a scanner engine that reads an image and a plotter engine that performs printing.

Functional Configuration of Image Processing Apparatus

An exemplary functional configuration of the image processing apparatus 10 that is put into use by the above-described hardware and software in cooperation with each other will be described.

Figure 4:
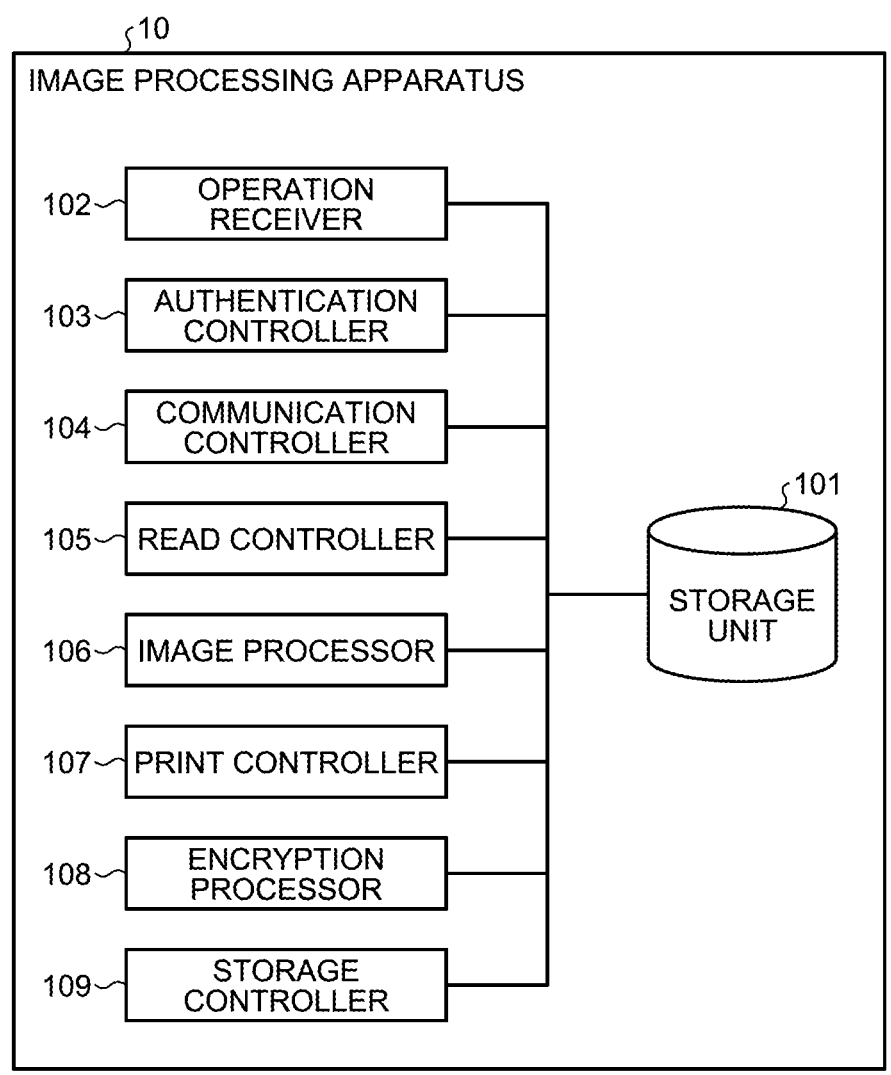
FIG. 4 is a diagram of an exemplary functional configuration of the image processing apparatus according to the embodiment.

FIG. 4 is a diagram of an exemplary functional configuration of the image processing apparatus 10 according to the embodiment. The image processing apparatus 10 according to the embodiment includes a storage unit 101, an operation receiver 102, an authentication controller 103, a communication controller 104, a read controller 105, an image processor 106, a print controller 107, an encryption processor 108 and a storage controller 109.

The storage unit 101 stores information. The information stored in the storage unit 101 is, for example, the logs representing the operations of each function of the image processing apparatus 10 that are performed according to instructions from the user who is authenticated by the authentication controller 103. Furthermore, for example, the information stored in the storage unit 101 is a second image to be described below.

The operation receiver 102 receives an operation input from a user.

The authentication controller 103 authenticates a user by performing the above-described authentication process.

The communication controller 104 performs a communication process of communicating with the information processing device 20 that is connected to the network 200. The communication controller 104, for example, receives a first image from the information processing device 20. The first image is an image to be processed by the image processing apparatus 10. The first image is, for example, an image representing information that is created by using, for example, document creation software of the information processing device 20.

The read controller 105 reads the information that is recorded in a recording medium, such as a paper medium, as a first image. Any data format may be used as the data format of the first image that is read by the read controller 105. The data format of the first image that is read by the read controller 105 is, for example, the JPEG format, the TIFF format or the PDF format.

The image processor 106 performs image processing to add a digital watermark containing the address information of the image processing apparatus 10 and accordingly generates a second image. The data format of the second image may be the same as or different from that of the first image.

Any address information may be used as the address information of the image processing apparatus 10. The address information of the image processing apparatus 10 is, for example, a WebAPI to access the image processing apparatus 10, the IP address of the image processing apparatus 10, the device number of the image processing apparatus 10, and the host name of the image processing apparatus 10.

The digital watermark according to the embodiment is an invisible digital watermark that is not visible to the user.

The advantage of adding the address information of the image processing apparatus 10 to an image by using the invisible watermark will be described.

FIG. 5 is a diagram illustrating Example 1 where adding a visible code 201 affects the appearance. The example illustrated in FIG. 5 represents the case where the address information is added to the first image by using the visible code 201, such as a barcode or a QR code (trademark). In this case, it is necessary to change the original layout of the first image to keep a space to add the visible code 201. In order not to change the layout of the first image, a limitation on the layout of the first image occurs, which is not preferable.

FIG. 6 is a diagram illustrating Example 2 where adding a background pattern affects the appearance. The example illustrated in FIG. 6 represents a case where the address information is added as a background to the first image by using a background pattern 202. In this case, the background pattern 202 affects the appearance of the first image, which is not preferable.

The image processor 106 according to the embodiment adds the address information of the image processing apparatus 10 to the first image by using the invisible digital watermark, which realizes the same appearance between the first image and the second image.

FIG. 4 will be referred back here. The image processor 106 stores the second image in the storage unit 101 via the storage controller 109.

By checking whether a digital watermark that is embedded is contained in an image that is specified by, for example, an operation on the operation receiver 102 by using the algorithm of the image processing apparatus 10, the image processor 106 checks whether the image is a second image that is processed by the image processing apparatus 10.

On receiving a taking-out request to take out the digital watermark contained in the second image from the information processing device 20 from the information processing device 20 via the communication controller 104, the image processor 106 performs image processing to take out the digital watermark contained in the second image and accordingly generates the first image. The image processor 106 then transmits the first image as a response to the taking-out request to the information processing device 20 via the communication controller 104.

The print controller 107 prints the second image. The appearance of the second image is the same as that of the first image and thus the address information that is added by the image processor 106 is not printed.

The encryption processor 108 performs a process of encrypting part of or all the information processed by the image processing apparatus 10 and a process of decrypting encrypted information. The information to be encrypted and decrypted is, for example information that is stored in the storage unit 101 and information that is transmitted and received to and from the information processing devices 20 via the network 200.

The storage controller 109 stores information in the storage unit 101. The storage controller 109 stores, for example, the second image in the storage unit 101.

Furthermore, for example, the storage controller 109 stores the log representing the result of the authentication process performed by the authentication controller 103 in the storage unit 101. The log representing the authentication result contains, for example, the date at which the authentication process is performed, the identification information that identifies the user, and the authentication result (whether the authentication is successful or the authentication is unsuccessful).

Furthermore, for example, when the first image is received from the information processing device 20, the storage controller 109 stores, in the storage unit 101, a log containing the identification information that identifies the user of the information processing device 20 from which the first image is transmitted.

The information that is used to specify the first image in the log is, for example, the data name of the first image and the harsh value that is calculated from the first image. The data name of the first image is, for example, acquired from a print job that is transmitted from the information processing device 20. The harsh value of the first image may be calculated by the information processing device 20 or may be calculated by the storage controller 109 on storing the log.

Furthermore, for example, when the information recorded in a recording medium, such as a paper medium, is read as the first image by the read controller, the storage controller 109 stores, in the storage unit 101, a log containing the identification information that identifies the user that makes an operation input to issue an instruction to read the first image.

Furthermore, for example, when the image processor 106 generates the second image, the storage controller 109 stores the log containing the identification information of the user that generates the second image in the storage unit 101. The identification information of the user who generates the second image is the identification information of the user of the information processing device 20 that transmits the first image from which the second image is generated or the identification information of the user of the information processing device 20 who makes an operation input to read the first image from which the second image is generated.

Descriptions of the information used to specify the second image in the log ire the same as those of the case of the first image and thus they will be omitted.

Furthermore, for example, when the second image is printed by the print controller 107, the storage controller 109 stores, in the storage unit 101, a log containing the identification information that identifies the user who prints the second image.

Furthermore, for example, when the taking-out request is received from the information processing device 20 and the image processor 106 takes out the digital watermark from the second image, the storage controller 109 stores, in the storage unit 101, a log containing the identification information that identifies the user of the information processing device 20 from which the taking-out request is transmitted.

Functional Configuration of Information Processing Device

An exemplary functional configuration of the information processing device 20 according to the embodiment will be described.

FIG. 7 is a diagram of an exemplary functional configuration of the information processing device 20 according to the embodiment. The information processing device 20 according to the embodiment includes a storage unit 211, a communication controller 212, a detector 213, a display unit 214, an input unit 215, and a storage controller 216.

The storage unit 211 stores information. The information stored in the storage unit 211 is for example, document data that is created by the user of the information processing device 20. Furthermore, for example, the information that is stored in the storage unit 211 is the second image that is generated by the image processing apparatus 10 by reading a recording medium, such as a paper medium.

The communication controller 212 communicates with the image processing apparatus 10 and another information processing device 20 via the network 200. The communication controller 212 transmits, to the image processing apparatus 10, a print job containing the first image that is generated by a print driver on the basis of, for example, document data and photo data. Furthermore, for example, when the detector 213 detects the digital watermark contained in the second image, the communication controller 212 transmits the taking-out request to the image processing apparatus 10. Furthermore, for example, the communication controller 212 receives, from the image processing apparatus 10, the first image that is generated by taking out the digital watermark from the second image as a response to the taking-out request.

When the user chooses data to view, the detector 213 detects the digital watermark from the data. When the digital watermark is detected, it is understood that the data is the second image that is processed by the image processing apparatus 10.

The display unit 214 displays information. When the detector 213 detects the digital watermark, the display unit 214 displays a user authentication screen.

FIG. 8 is a diagram of an exemplary authentication screen according to the embodiment. In the example illustrated in FIG. 8, the address information contained in the digital watermark (the host name of the image processing apparatus 10) is displayed as a device by which the user is authenticated. When a transmission button is pressed in a state where the user ID and a password are input, the communication controller 212 transmits the user ID and the password to the image processing apparatus 10.

On receiving an authentication result representing that the authentication is successful from the image processing apparatus 10, the communication controller 212 transmits the taking-out request to the image processing apparatus 10. The communication controller 212 receives, as the response to the taking-out request, the first image that is generated by taking out the digital watermark from the second image. The storage controller 216 stores the first image in the storage unit 211 by overwriting the second image with the first image.

On the other hand, when the communication controller 212 receives an authentication result representing that the authentication is unsuccessful from the image processing apparatus 10, the display unit 214 displays an authentication error screen.

Figure 9:
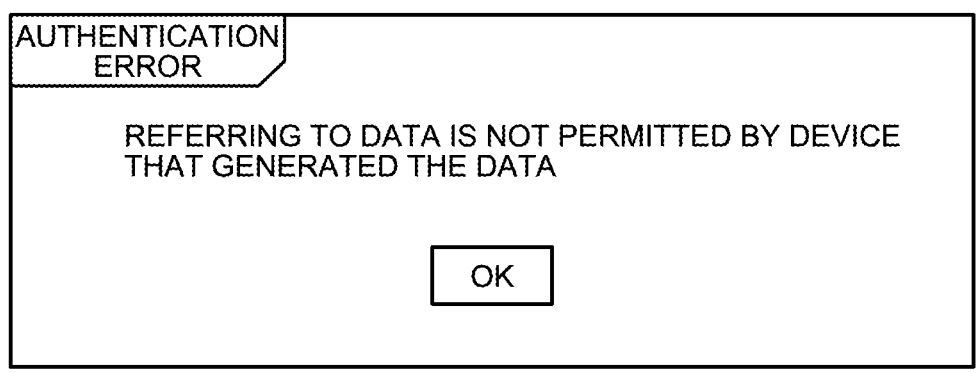
FIG. 9 is a diagram of an exemplary authentication error screen according to the embodiment.

FIG. 9 is a diagram of an exemplary authentication error screen according to the embodiment. FIG. 9 exemplifies the case where a message representing that referring to the data is not permitted is displayed.

FIG. 7 will be referred back here. The input unit 215 receives an input to operate the information an input representing data to view is chosen. The storage controller 216 stores information in the storage unit 211.

Hardware Configuration of Information Processing Device

An exemplary hardware configuration of the information processing device 20 according to the embodiment will be described.

Figure 10:
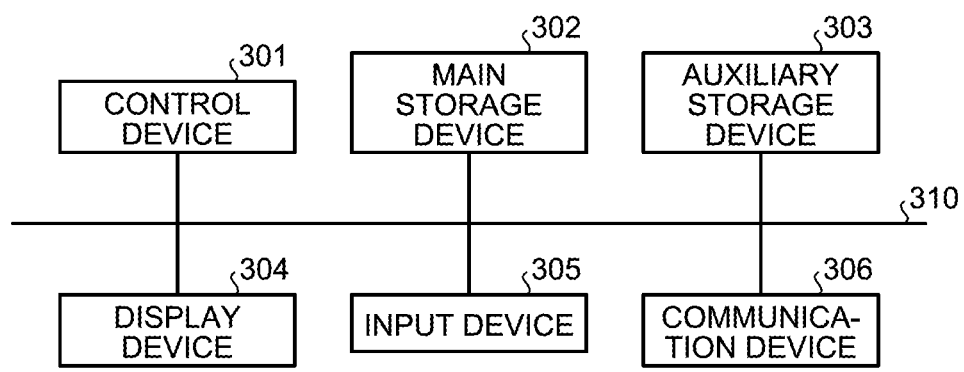
FIG. 10 is a diagram of an exemplary hardware configuration of the information processing apparatus according to the embodiment.

FIG. 10 is a diagram of an exemplary hardware configuration of the information processing device 20 according to the embodiment. The information processing device 20 according to the embodiment includes a control device 301, a main storage device 302, an auxiliary storage device 303, a display device 304, an input device 305 and a communication device 306. The control device 301, the main storage device 302, the auxiliary storage device 303, the display device 304, the input device 305 and the communication device 306 are connected with each other via a bus 310.

The control device 301 executes the program that is read from the auxiliary storage device 303 into the main storage device 302. The main storage device 302 is a memory, such as a ROM and a RAM. The auxiliary storage device 303 is, for example, a memory card.

The display device 304 displays information. The display device 304 is, for example, a liquid crystal display. The input device 305 receives an input of information. The input device 305 is, for example, a keyboard and a mouse. The display device 304 and the input device 305 may be a liquid crystal touch panel having a display function and an input function. The communication device 306 communicates with another device.

The program that is executed by the information processing device 20 is stored in a file in an installable or an executable format in a computer-readable storage medium, such as a CD-ROM, a memory card, a CD-R, or a digital versatile disk (DVD), and is provided as a computer program product.

The program that is executed by the information processing device 20 may be configured to be stored in a computer that is connected to a network, such as the Internet, and to be provided by being downloaded via the network. The program that is executed by the information processing device 20 may be configured to be provided via the network, such as the Internet, without being downloaded.

The program of the information processing device 20 may be configured to be incorporated in, for example, a ROM in advance and provided.

The program of the information processing device 20 has a module configuration that includes functional blocks implementable by the program among the functional blocks described above. The control device 301 serving as practical hardware reads the program from the recording medium, such as the auxiliary storage device 303, and executes the program and accordingly the functional blocks implementable by the program are loaded into the main storage device 302. In other words, the functional blocks implemented by the program are generated in the main storage device 302.

Part or all the functional blocks implementable by the program may be implemented by using hardware, such as an integrated circuit, without being implemented by the program.

Image Processing Method

An image processing method according to the embodiment will be described.

Figure 11:
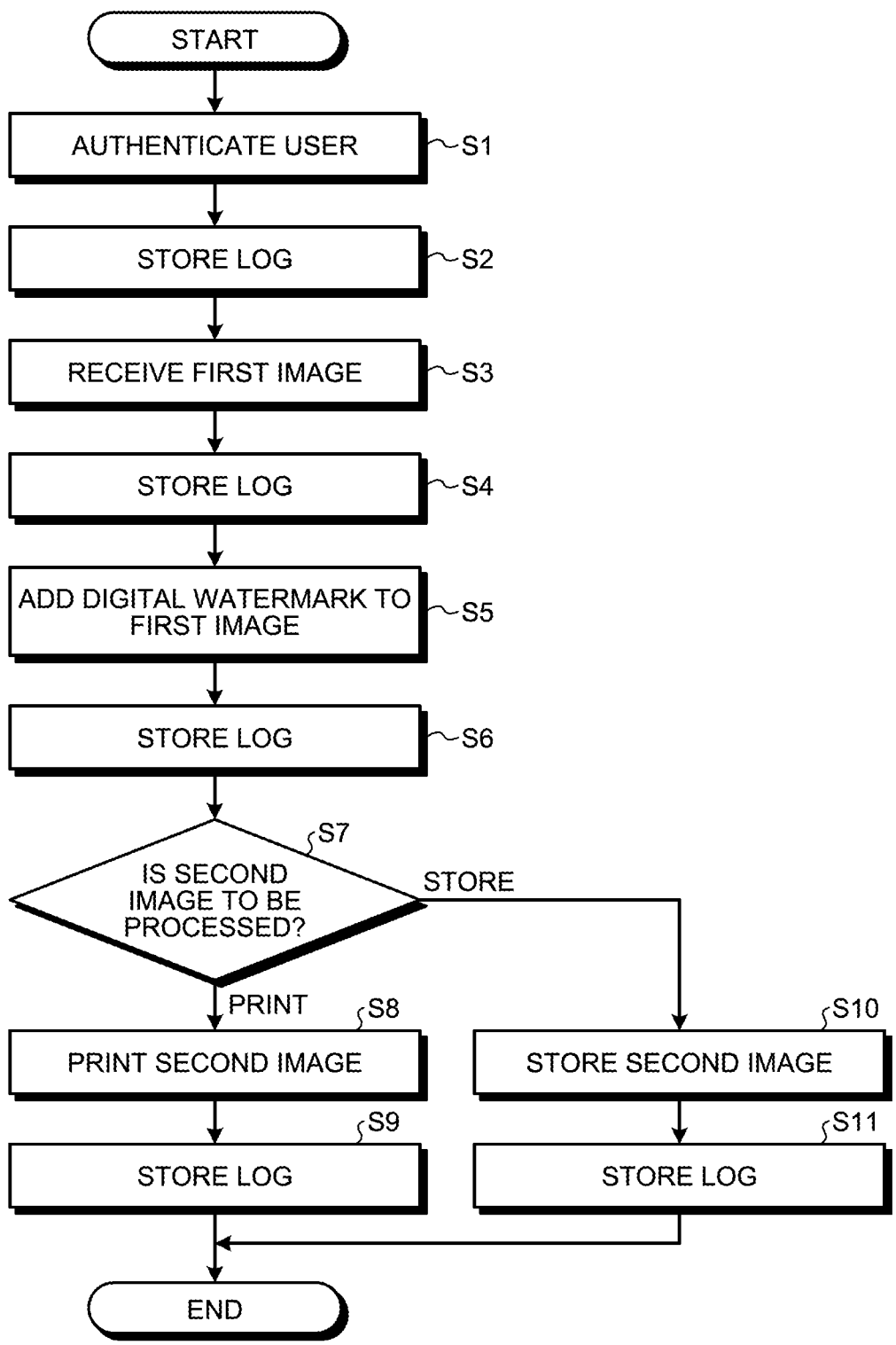
FIG. 11 is a flowchart of an exemplary image processing method according to the embodiment performed in the case where a first image is received.

FIG. 11 is a flowchart of an exemplary image processing method according to the embodiment performed in the case where the first image is received. First of all, the authentication controller 103 performs a process of authenticating a user who establishes a connection to the image processing apparatus 10 from the information processing device 20 (step S1). The authentication controller 103 then stores a log representing an authentication result of the authentication process at step S1 in the storage unit 101 (step S2). The case where the authentication result of the process of authenticating the user who establishes a connection to the image processing apparatus 10 from the information processing device 20 represents that the authentication is successful will be described.

The communication controller 104 receives the first image from the information processing device 20 (step S3). Specifically, when the image processing apparatus 10 prints the first image, the communication controller 104 receives a print job containing a first image. When the first image is stored in the image processing apparatus 10, the communication controller 104 receives given data representing the first image.

The communication controller 104 then stores a log containing identification information that identifies the user of the information processing device 20 from which the first image is transmitted in the storage unit 101 via the storage controller 109 (step S4).

The image processor 106 then performs image processing to add a digital watermark containing the address information of the image processing apparatus 10 to the first image and accordingly generates a second image (step S5). The image processor 106 then stores, as the identification information of the user who generates the second mage, a log containing the identification information of the user who is authenticated by the authentication process at step S1 in the storage unit 101 via the storage controller 109 (step S6).

When the second image is printed (step S7, Print), the print controller 107 prints the second image that is generated by performing the process at step S5 (step S8). The print controller 107 then stores, as the identification information of the user who prints the second image, a log containing the identification information of the user who is authenticated by performing the authentication process at step S1 in the storage unit 101 via the storage controller 109 (step S9).

When the second image is stored (step S7, Store), the print controller 107 stores the second image that is generated by performing the process at step S5 in the storage unit 101 (step S10). The print controller 107 then stores, as the identification information of the user who stores the second image, the log containing the identification information of the user who is authenticated by performing the authentication process at step S1 in the storage unit 101 via the storage controller 109 (step S11).

Figure 12:
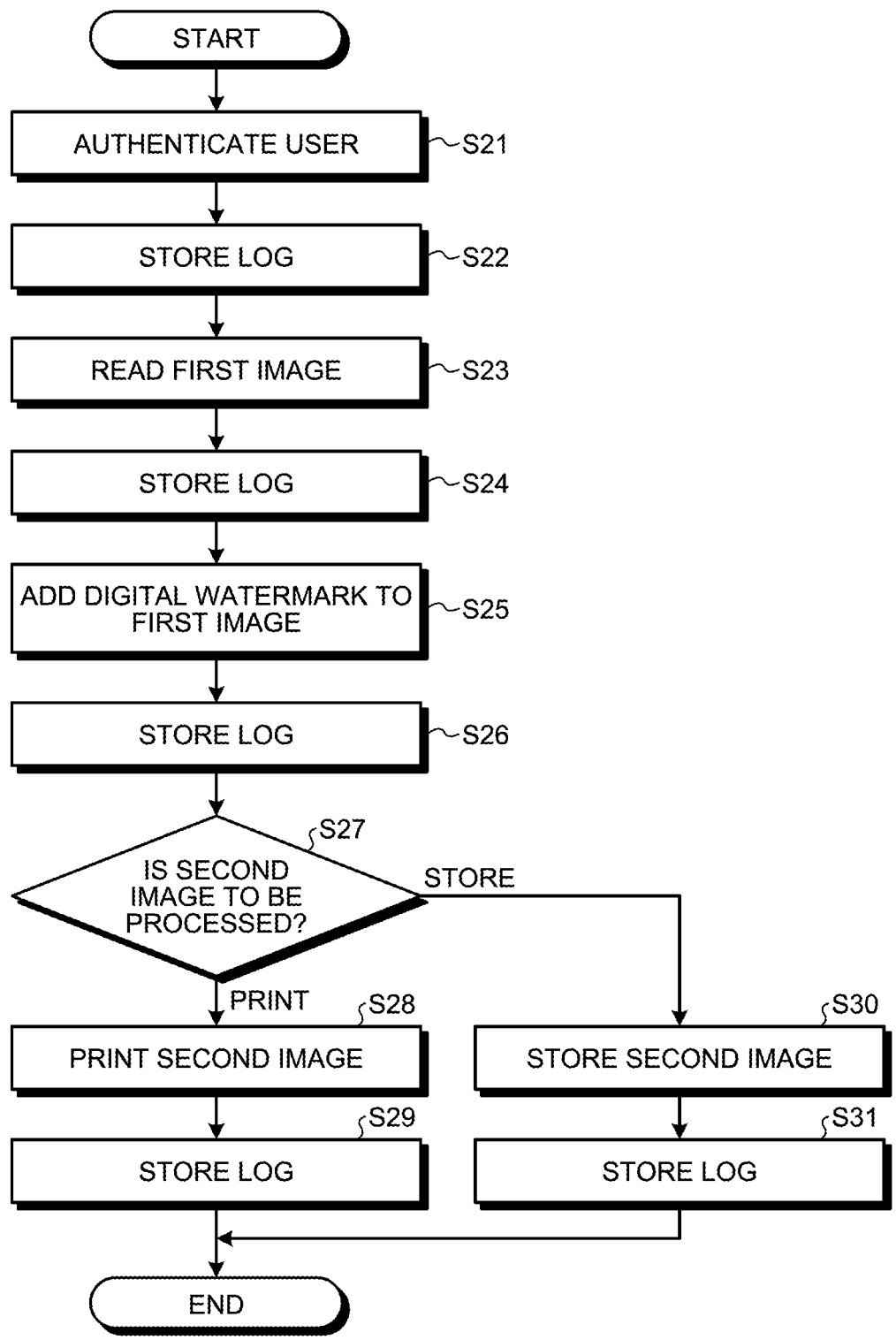
FIG. 12 is a flowchart of an exemplary image processing method according to the embodiment performed in the case where a first image is read.

FIG. 12 is a flowchart of an exemplary image processing method performed in the case where a first image is read. First of all, the authentication controller 103 performs the user authentication process by using identification information of the user and a password that are input by the operation receiver 102 (step S21). The user authentication process may be performed by reading an ID card owned by the user. The authentication controller 103 then stores a log representing the authentication result of the authentication process at step S21 in the storage unit 101 (step S22). The case will be described where the authentication result of the process of authenticating the user who establishes a connection to the image processing apparatus 10 from the information processing device 20 represents that the authentication is successful.

The read controller 105 reads the information that is recorded in a storage medium, such as a paper medium, as a first image (step S23).

The communication controller 104 then stores a log containing the identification information that identifies the user who makes an operation input to make an instruction to read the first image in the storage unit 101 via the storage controller 109 (step S24).

Descriptions of steps S25 to S31 are the same as those of steps S5 to S11 (see FIG. 11) and thus they will be omitted.

Figure 13:
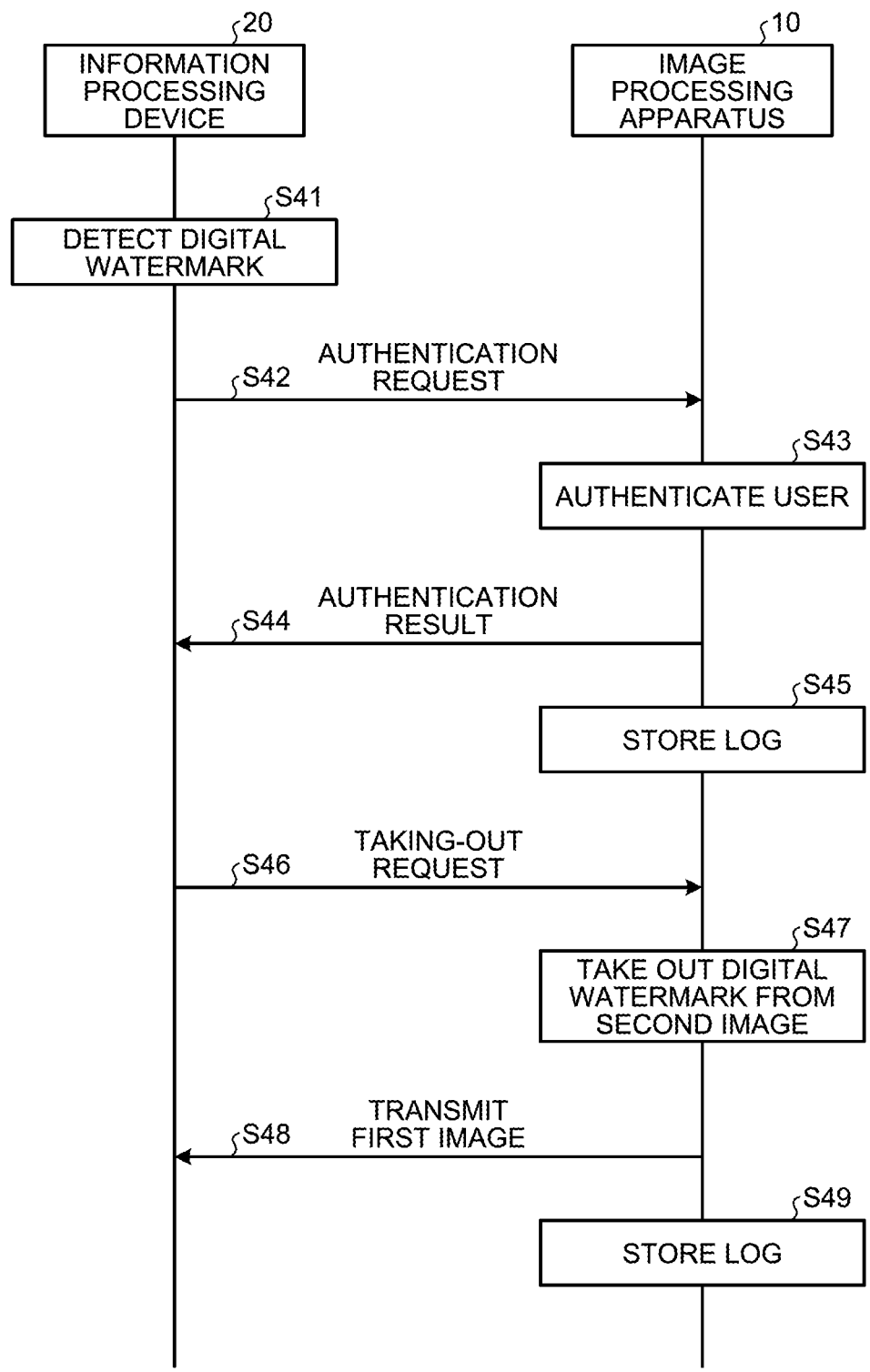
FIG. 13 is a flowchart of an exemplary image processing method according to the embodiment performed in the case where a digital watermark is taken out.

FIG. 13 is a flowchart of an exemplary image processing method according to the embodiment performed in the case where a digital watermark is taken out. First of all, the information processing device 20 (the detector 213) detects a digital watermark contained in a second image (step S41). The information processing device 20 (the communication controller 212) then transmits an authentication request containing identification information of the user and a password to the image processing apparatus 10 (step S42).

The image processing apparatus 10 (the authentication controller 103) then performs the user authentication process in response to the authentication request that is transmitted at step S42 (step S43). The image processing apparatus 10 (the communication controller 104) transmits the authentication result of the authentication process at step S43 to the information processing device 20 (step S44). The image processing apparatus 10 (the storage controller 109) then stores a log representing the result of the authentication process at step S43 in the storage unit 101 (step S45).

When the authentication result that is transmitted at step S44 represents that the authentication is successful, the information processing device 20 (the communication controller 212) transmits the above-described taking-out request to the image processing apparatus 10 (step S46).

The image processing apparatus 10 (the image processor 106) performs image processing to take out the digital watermark contained in the second image in response to the taking-out request that is transmitted from the information processing device 20 at step S46 and accordingly generates a first image (step S47). The image processing apparatus 10 (the communication controller 104) then transmits the first image that is generated at step S47 to the information processing device 20 (step S48). The image processing apparatus 10 (the storage controller 109) then stores, in the storage unit 101, a log containing the identification information that identifies the user of the information processing device 20 that transmits the taking-out request at step S48 (step S49).

As described above, in the image processing apparatus 10 according to the embodiment, the image processor 106 generates the second image by performing the image processing to add the digital watermark containing the address information of the image processing apparatus 10 to the first image. The storage controller 109 stores the second image and the log representing the operations of each of the above-described functions in the storage unit 101.

Accordingly, it is possible to specify the user of the information contained in the first image that is processed by the image processing apparatus 10 from the address information of the image processing apparatus 10 contained in the second image and the log stored in the storage unit 101 of the image processing apparatus 10.

The storage controller 109 stores, in the storage unit 101, the log containing the identification information that identifies the user of the information processing device 20 that transmits the taking-out request, which makes it possible to specify the user who takes out the digital watermark containing the address information of the image processing apparatus 10. In other words, it is possible to acquire the second image and specify the user of the information processing device 20 who refers to the second image.

According to the embodiment, there is an effect that it is possible to specify a user of information contained in a printed matter that is printed by the image processing apparatus and electronic data that is generated by the image processing apparatus.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image processing apparatus that is connected to a plurality of information processing devices via a network, the image processing apparatus comprising:
   an operation receiver configured to receive an operation input from a user;
   an authentication controller configured to authenticate a user of the information processing device that connects to the image processing apparatus and a user who operates the operation receiver;
   an image processor configured to perform image processing to add a digital watermark containing address information of the image processing apparatus to a first image to be processed by the image processing apparatus to thereby generate a second image;
   a communication controller configured to receive a taking-out request to take out the digital watermark contained in the second image from the information processing device; and
   a storage controller configured to store, in a storage unit, a log representing an operation of the image processing apparatus that is performed according to an instruction of the user who is authenticated by the authentication controller,
   wherein
   when the communication controller receives the taking-out request, the image processor performs image processing to take out the digital watermark contained in the second image to thereby generate the first image,
   the communication controller transmits the first image that is generated by the image processor to the information processing device, and
   the storage controller stores, in the storage unit, the log containing identification information that identifies the user of the information processing device from which the taking-out request is transmitted.

2. The image processing apparatus according to claim 1, wherein
   the communication controller receives the first image from the information processing device, and
   the storage controller stores, in the storage unit, the log containing the identification information that identifies the user of the information processing device from which the first image is transmitted.

3. The image processing apparatus according to claim 1, further comprising a read controller configured to read information that is recorded in a recording medium as the first image,
   wherein the storage controller stores, in the storage unit, the log containing the identification information that identifies the user who makes an operation input to issue an instruction to read the first image.

4. The image processing apparatus according to claim 1, further comprising a print controller configured to print the second image,
   wherein the storage controller stores, in the storage unit, the log containing identification information that identifies the user who makes an operation input to issue an instruction to print the second image.

5. The image processing apparatus according to claim 1, wherein the image processor adds, to the first image, an invisible digital watermark that is not visible to the user as the digital watermark.

6. An image processing method performed by an image processing apparatus that is connected to a plurality of information processing devices via a network, the image processing method comprising:
   by the image processing apparatus, receiving an operation input from a user;
   by the image processing apparatus, authenticating a user of the information processing device that connects to the image processing apparatus and a user who makes the operation input;
   by the image processing apparatus, performing image processing to add a digital watermark containing address information of the image processing apparatus to a first image to be processed by the image processing apparatus to thereby generate a second image;
   by the image processing apparatus, receiving a taking-out request to take out the digital watermark contained in the second image from the information processing device;
   by the image processing apparatus, storing, in a storage unit, a log representing an operation of the image processing apparatus that is performed according to an instruction of the user who is authenticated at the authenticating,
   by the image processing apparatus, on receiving the taking-out request, performing image processing to take out the digital watermark contained in the second image to thereby generate the first image,
   by the image processing apparatus, transmitting the first image that is generated at the generating the first image, and
   by the image processing apparatus, storing, in the storage unit, the log containing identification information that identifies the user of the information processing device from which the taking-out request is transmitted.

7. A non-transitory computer-readable medium comprising a computer program that causes an image processing apparatus that is connected to a plurality of information processing devices via a network to function as:
   an operation receiver configured to receive an operation input from a user;
   an authentication controller configured to authenticate a user of the information processing device that connects to the image processing apparatus and a user who operates the operation receiver;
   an image processor configured to perform image processing to add a digital watermark containing address information of the image processing apparatus to a first image to be processed by the image processing apparatus to thereby generate a second image;
   a communication controller configured to receive a taking-out request to take out the digital watermark contained in the second image from the information processing device; and
   a storage controller configured to store, in a storage unit, a log representing an operation of the image processing apparatus that is performed according to an instruction of the user who is authenticated by the authentication controller, wherein
when the communication controller receives the taking-out request, the image processor performs image processing to take out the digital watermark contained in the second image to thereby generate the first image,
the communication controller transmits the first image that is generated by the image processor to the information processing device, and
the storage controller stores, in the storage unit, the log containing identification information that identifies the user of the information processing device from which the taking-out request is transmitted.

\* \* \* \* \*